United States Patent
Mangan et al.

(10) Patent No.: US 7,248,160 B2
(45) Date of Patent: Jul. 24, 2007

(54) COMPUTERIZED INDELIBLE TRACKING SYSTEM

(75) Inventors: Anthony Mangan, San Jose, CA (US); Kenneth J. Malone, Socorro, NM (US)

(73) Assignee: Pinpoint Logistics Systems, Inc., Santa Clara, CA (US)

( * ) Notice: Subject to any disclaimer, the term of this patent is extended or adjusted under 35 U.S.C. 154(b) by 211 days.

(21) Appl. No.: 11/112,857

(22) Filed: Apr. 22, 2005

(65) Prior Publication Data

US 2006/0238334 A1 Oct. 26, 2006

(51) Int. Cl.
*G06Q 99/00* (2006.01)

(52) U.S. Cl. .............................. 340/539.13; 340/572.4; 455/456.1; 705/1

(58) Field of Classification Search ........... 340/539.13, 340/539.16–539.18, 531, 505, 10.1, 572.1, 340/572.4; 705/1, 7–9, 11; 455/456.1, 456.3, 455/456.6, 457
See application file for complete search history.

(56) References Cited

U.S. PATENT DOCUMENTS

| | | | | |
|---|---|---|---|---|
| 5,485,369 | A | 1/1996 | Nicholls et al. ................ | 705/9 |
| 5,640,002 | A | 6/1997 | Ruppert et al. ......... | 235/462.46 |
| 5,648,770 | A | 7/1997 | Ross .......................... | 340/994 |
| 5,774,876 | A | 6/1998 | Woolley et al. ............... | 705/28 |
| 5,869,819 | A * | 2/1999 | Knowles et al. ............ | 235/375 |
| 5,917,925 | A | 6/1999 | Moore ......................... | 382/101 |
| 5,959,568 | A | 9/1999 | Woolley ...................... | 342/42 |
| 6,010,239 | A | 1/2000 | Hardgrave et al. ......... | 700/213 |
| 6,087,952 | A | 7/2000 | Prabhakaran ............. | 340/693.5 |
| 6,300,873 | B1 * | 10/2001 | Kucharczyk et al. .... | 340/568.1 |
| 6,600,418 | B2 * | 7/2003 | Francis et al. ........... | 340/572.1 |
| 6,688,522 | B1 | 2/2004 | Philyaw et al. ........ | 235/462.01 |
| 6,736,322 | B2 | 5/2004 | Gobburu et al. ....... | 235/462.46 |
| 6,753,830 | B2 | 6/2004 | Gelbman ..................... | 345/55 |
| 6,757,710 | B2 | 6/2004 | Reed .......................... | 709/203 |
| 2002/0156645 | A1 * | 10/2002 | Hansen .......................... | 705/1 |
| 2003/0182265 | A1 * | 9/2003 | Robbins ....................... | 707/1 |
| 2004/0030572 | A1 * | 2/2004 | Campbell et al. .............. | 705/1 |

(Continued)

OTHER PUBLICATIONS

Nextel—GPS Track [online] [retrieved Dec. 22, 2004] Retrieved from the Internet <http://www.nextel.com/about/enterprise/wbs/gps/track.shtml>, 2 pages.

(Continued)

*Primary Examiner*—Thomas Mullen
(74) *Attorney, Agent, or Firm*—Lumen Intellectual Property Services, Inc.

(57) ABSTRACT

A new computerized tracking system, IndeliTrak, that incorporates the state-of-the-art technologies including cell phones, GPS, Internet, and scanners to gather and distribute up-to-the-minute tracking data with little effort. As an example, a courier carries a mobile phone that is attached to a barcode scanner and programmed with IndeliTrak's tracking software. The mobile phone enables the courier to log in, retrieve his service schedule, verify each service location, log arrival/departure time, scan packages for pickup and delivery, and sign off. Scanned data are stored on the phone and transmitted to a customized IndeliTrak database. End users can track the packages via IndeliTrak's browser-based user interface almost instantaneously. IndeliTrak does not require unique package identifications (IDs) or barcodes. Acceptable IDs include radio frequency identification (RFID) tags, non-serialized barcodes, electronic product codes (EPCs), etc. The same ID code can be reused daily.

15 Claims, 9 Drawing Sheets

U.S. PATENT DOCUMENTS

| | | | |
|---|---|---|---|
| 2004/0124977 A1 | 7/2004 | Biffar | 340/539.13 |
| 2004/0201454 A1 | 10/2004 | Waterhouse et al. | 340/10.1 |
| 2004/0230601 A1* | 11/2004 | Joao et al. | 707/102 |
| 2004/0243430 A1 | 12/2004 | Horstemeyer | 705/1 |
| 2004/0254812 A1 | 12/2004 | Horstemeyer | 705/1 |
| 2005/0289008 A1* | 12/2005 | Olivier et al. | 705/22 |
| 2006/0229895 A1* | 10/2006 | Kodger | 705/1 |

OTHER PUBLICATIONS

AirClic—Devices [online] [retrieved Dec. 22, 2004] Retrieved from the Internet <http://www.airclic.com/devices/>, 2 pages.

Comet Tracker [online] [retrieved Dec. 22, 2004] Retrieved from the Internet <http://www.comettracker.com/index.html>, 1 page.

ActSoft Transportation Management Software, Comet Overview [online] [retrieved Dec. 22, 2004] Retrieved from the Internet <http://www.actsoft.com/products/comet.html>, 2 pages.

Vertrax, SmartTrax [online] [retrieved Dec. 22, 2004] Retrieved from the Internet <http://www.vertrax.com/products_smarttrax.html>, 1 page.

Vertrax, SmartDrops [online] [retrieved Dec. 22, 2004] Retrieved from the Internet <http://www.vertrax.com/products_smartdrops.html>, 1 page.

Per Enge et al., "Data and Sensitivity Assistance for Mobile Users of GPS from the @Road Reference Network" <http://www.atroad.com/corp/technology/white_papers.html>, Apr. 2001, 9 pages.

@Road Mobile Resource Management, "The end of middleware: Direct Data Integration Services Mobile Enterprise Access (MEA) White Paper," <http://www.atroad.com/corp/technology/white_papers.html>, Mar. 2004, 9 pages.

* cited by examiner

130

© 2005 IndeliTrak, Inc. (17 U.S.C. 401)

FIG. 2

COMPUTERIZED INDELIBLE TRACKING SYSTEM

COPYRIGHT NOTICE AND AUTHORIZATION

A portion of the disclosure of this patent document contains materials that are subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

COMPUTER PROGRAM LISTING APPENDIX

A computer program listing is submitted under 37 CFR 1.96(c) as an appendix hereto on two compact discs, an original and a duplicate thereof, in compliance with 37 CFR 1.52(e). Each compact disc stores 309 items which are incorporated herein by reference and which contain computer executable instructions, routines, and other contents of both server and client programs implementing an embodiment of the present invention.

FIELD OF THE INVENTION

This invention relates generally to computerized tracking systems. More particularly, it relates to a comprehensive, efficient, and highly automated, GPS-assisted, computerized tracking system that is particularly useful for accurate real-time tracking of time-sensitive deliveries and pickups.

BACKGROUND AND SUMMARY OF THE INVENTION

Computerized tracking systems are currently in use by many courier companies. For example, Comet Tracker from ActSoft, Inc. of Tampa, Fla. utilizes cellular phones equipped with the Global Positioning System (GPS) transceivers to track personnel movements. SmartTrax from Vertrax, Inc. of New Haven, Conn. utilizes vehicles equipped with the GPS transceivers to track vehicle movements. As a separate software package, Vertrax also offers SmartDrops for mapping, routing, and delivery planning.

A key difference between existing systems and the present invention, hereinafter referred to as IndeliTrak™, is that IndeliTrak provides a full courier solution and requires very few additional steps for tracking packages, taking particular advantages of the capabilities of today's wireless communications technologies, for example, cellular phones, GPS, wireless Internet connectivity, infrared (IR) code readers or laser barcode scanners, and radio frequency identification (RFID) tags.

IndeliTrak's proprietary software seamlessly incorporates these technologies to enable field personnel, e.g., a driver, to obtain and provide tracking data naturally with very little effort beyond what is needed for the actual delivery. For example, route stops are digitally made available in real time to the drivers. Automatic verification ensures the delivery of all planned packages. The pocket size and form factor of a phone-scanner mobile unit allows the driver to easily carry the unit while carrying packages. In an embodiment, a basic Indelitrak mobile unit is a GPS- and Internet-enabled mobile phone programmed with IndeliTrak proprietary software and attached with an IR barcode reader. The mobile unit enables its user to access, in real time, the IndeliTrak server over a wireless Internet connection.

As an example, a driver gathers data upon package pickup or delivery via the mobile unit. The gathered data are immediately stored on the phone and uploaded wirelessly over the Internet to the IndeliTrak server and stored in the IndeliTrak database. The IndeliTrak server has a browser-based user interface that promptly shows the uploaded data to courier customers and managers having access thereto.

A core technology of IndeliTrak is how packages are scanned into the system. Unlike conventional computerized tracking systems, IndeliTrak does not require fully unique package IDs or barcodes. The ability of IndeliTrak to eliminate this requirement while maintaining system integrity contributes to the robustness of IndeliTrak. Moreover, the same barcode can be reused daily. This is a resource-saving advantage as envelopes and/or bags can be recycled without replacing the barcode tag. The only limitation is that duplicate barcodes cannot be part of the same individual pickup or delivery. The IndeliTrak object-oriented based software accepts just about any and all IDs, whether unique or not, without any a priori knowledge or prior coordination. Acceptable IDs include, but not limited to, radio frequency identification (RFID) tags, barcodes generated by a customer, electronic product code (EPC) from the bottom of a tissue box, etc. In this way, IndeliTrak administrators and customers alike are able to find and track each transaction and individual packages without having to know the package IDs. The elimination of long unique ID strings concatenated from multiple data sources has the additional advantage of alleviating the low-bandwidth requirements of the mobile phones.

The IndeliTrak system is optimized for same-day, route-based deliveries. However, it is flexible and can be readily implemented to work in most any courier services. In practice, IndeliTrak drivers are happy to adopt the system because it makes their job much easier and more productive. The latter contributes to higher pay because they are able to deliver more packages in the same or shorter time frame. The overall system is characterized by its high efficiency, accuracy, responsiveness, flexibility, minimal learning curve, and labor-saving features.

Other objects and advantages of the present invention will become apparent to one skilled in the art upon reading and understanding the preferred embodiments described below with reference to the following drawings.

BRIEF DESCRIPTION OF THE DRAWINGS

FIG. 2 is a screenshot of a browser-based user interface according to an embodiment of the present invention.

DETAILED DESCRIPTION OF THE INVENTION

Figure 1:
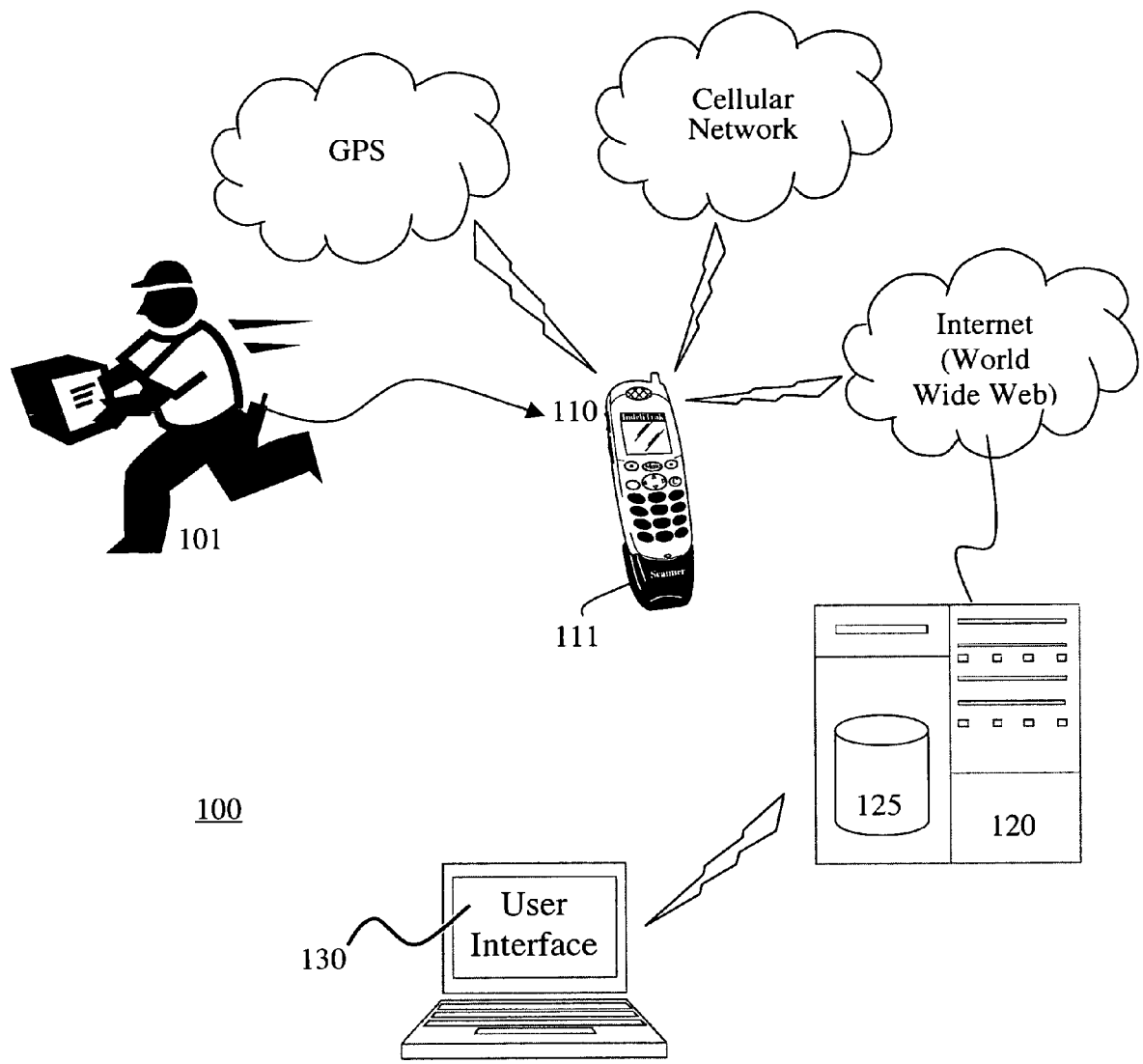
FIG. 1 shows an exemplary system setup according to an embodiment of the present invention.
Figure 3:
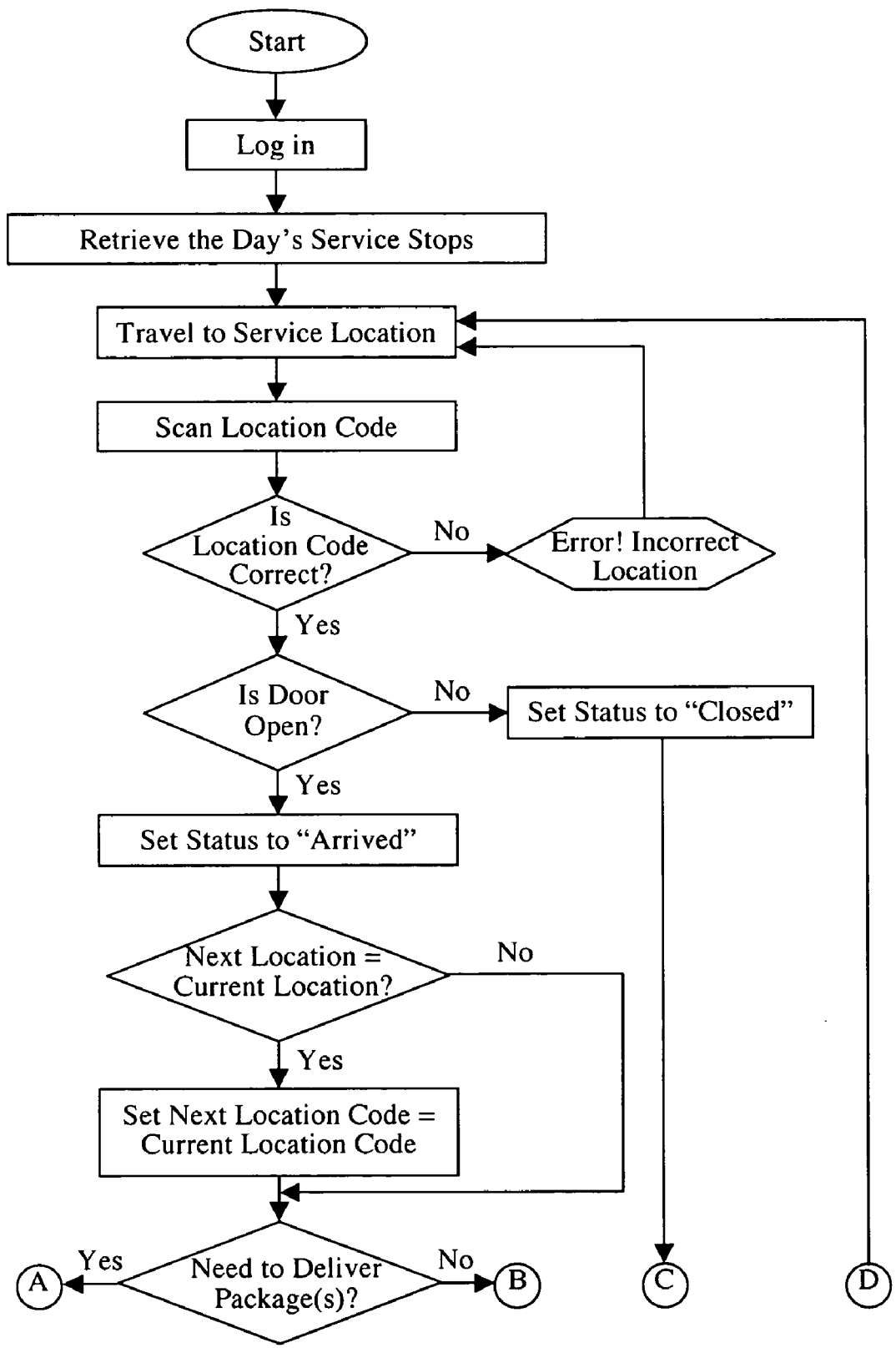
FIGS. 3-6 are flowcharts illustrating a courier's day's work according to an embodiment of the present invention.

FIG. 1 shows a general setup of an exemplary IndeliTrak system 100, which comprises at least one mobile unit 110 attached with a scanner 111. The mobile unit 110 is Internet-enabled and is programmed with an IndeliTrak Java phone client. In an embodiment, the IndeliTrak Java phone client is built with Java 2 Micro Edition Wireless Toolkit. The IndeliTrak proprietary source code, © 2005 IndeliTrak, Inc. (17 U.S.C. 401), is contained in the above-referenced computer program listing appendix and incorporated herein by reference.

The IndeliTrak system 100 further comprises a Web-based IndeliTrak server 120 and an IndeliTrak custom database 125. FIG. 1 shows that the database 125 is implemented in a storage device residing at the server machine 120. However, this is not required and other configurations are possible, so long as the storage device implementing the database is connected to the server.

In an embodiment, the IndeliTrak server 120 is built with Plone 2.0 content management system, running on Zope 2.7 web application server and using the Python 2.3 scripting language. Preferably, the IndeliTrak database 125 is a relational database. In this case, the IndeliTrak server 120 is correspondingly built with a relational database server such as MySQL, Oracle®, PostgreSQL, or SQLServer.

Figure 2:
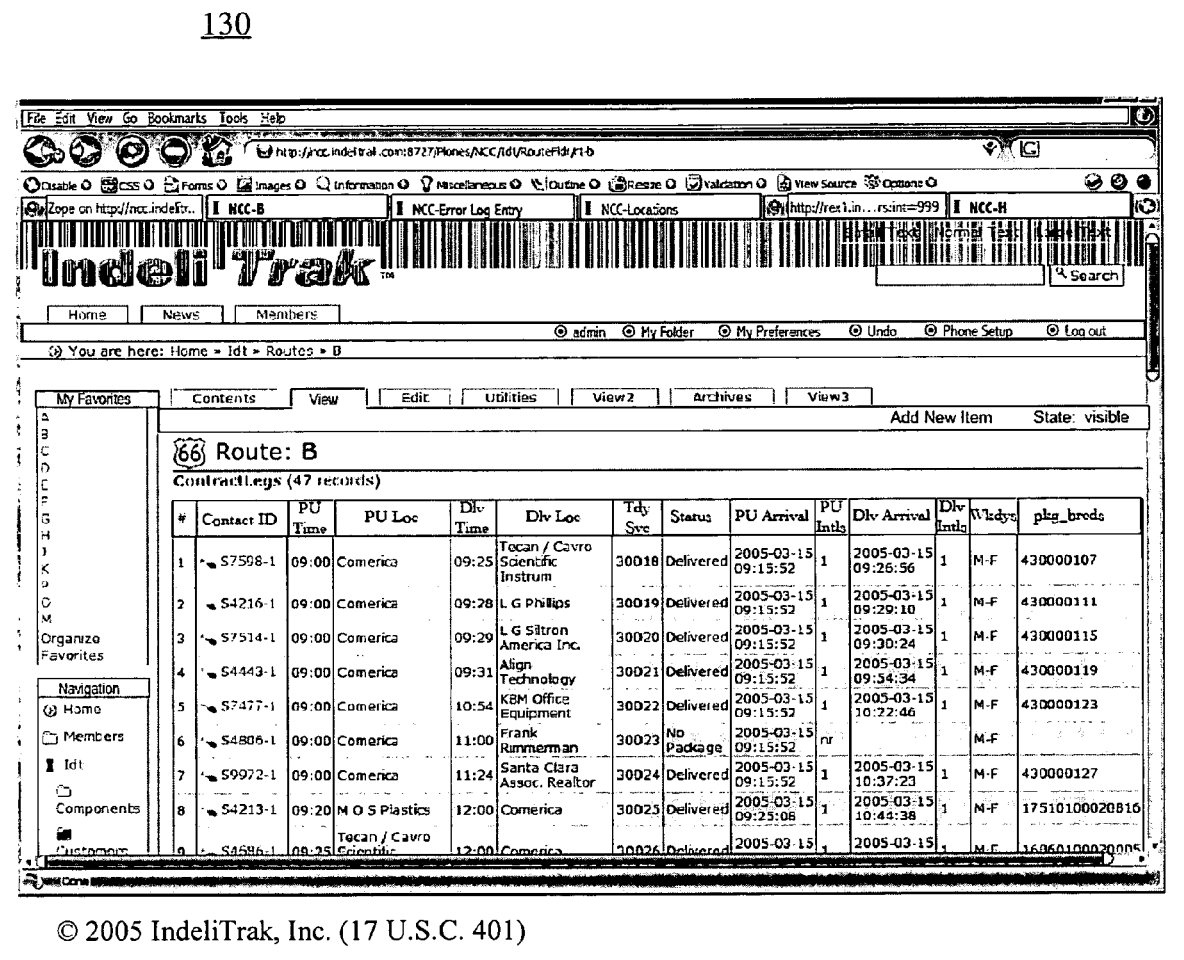

A user of the IndeliTrak system 100 interacts with the IndeliTrak server 120 and accesses the IndeliTrak database 125 via a browser-based user interface 130. An actual screenshot of an exemplary IndeliTrak user interface 130 is shown in FIG. 2. Taking advantage of the Internet connectivity and combined with the latest network security, the IndeliTrak system is securely and conveniently accessible virtually anywhere, any time.

The IndeliTrak database 125 receives, stores, and provides pickup and delivery times, pickup and delivery locations, and package IDs for packages moved or otherwise transported by an IndeliTrak courier 101. At the start of his shift, a courier 101 logs in through his mobile unit 110 and retrieves information about his service stops, e.g., scheduled transaction (pickup/delivery) times, addresses, phone numbers, contacts (names, titles, etc.), directions, special handling instructions, and so on.

If the mobile unit 110 is new or if there is any doubt about the stops or information stored on his phone, the courier 101 can start fresh by synchronizing the mobile unit 110 with the server 120 to receive any and all necessary and accurate up-to-the-minute information about his daily route. The mobile unit 110 preferably displays all pickup and delivery stops sorted by scheduled transaction time. During the day, any and all changes such as additional stops and change of time are automatically downloaded to the mobile unit 110 whenever it syncs with the server 120.

Each package is linked to each pickup stop via the location code and customer ID or contract ID. Each pickup stop is intelligently linked to one or more delivery stops and each delivery stop is linked to one or more pickup stops. Every IndeliTrak (IDT) pickup/delivery service (IDTS) is part of a contract and each contract is contained within a route that is assigned to a driver. The IDTS for each particular day has a unique ID and packages for that day are linked to the IDTS (see FIG. 2). This linkage is necessary to ensure that packages are delivered to the correct location. Because of IndeliTrak's intelligent linking feature, package IDs can remain unknown until the moment of pickup (see FIGS. 3-6).

Unlike conventional tracking systems, IndeliTrak uniquely allows a customer to use all kinds of ID codes recognizable by the scanner 111. The customer can arbitrarily generate her own barcodes or use existing ID codes such as electronic product codes, RFID tags, non-serialized IndeliTrak barcodes, etc. This flexibility is characteristic of IndeliTrak, attributing to its many advantages, e.g., saves time and labor, reduces cost, increases personnel performance, and conserves resources, etc.

As shown in FIGS. 3-6, an IndeliTrak courier, referred to as the "driver" in this example, follows the sorted list to each destination (service location). Upon arrival, the driver verifies whether he has arrived at the correct location by scanning a location code. The location code is previously provided to the customer, in the form of a barcode sticker or label, and is positioned at a certain place known to the driver. Alternatively, the driver invokes the mobile unit's GPS capability to verify the expected footprint for that location.

If the location is not correct, the mobile unit is programmed to trigger an alarm and not to proceed with the transaction unless the driver manually overrides the order of stops and selects a stop that corresponds to his current location.

If delivery and pickup take place at the same location and scheduled time, the location establishment is followed by delivery and then pickup. Once the correct location is verified, the mobile unit is programmed to record the arrival time.

Figure 4:
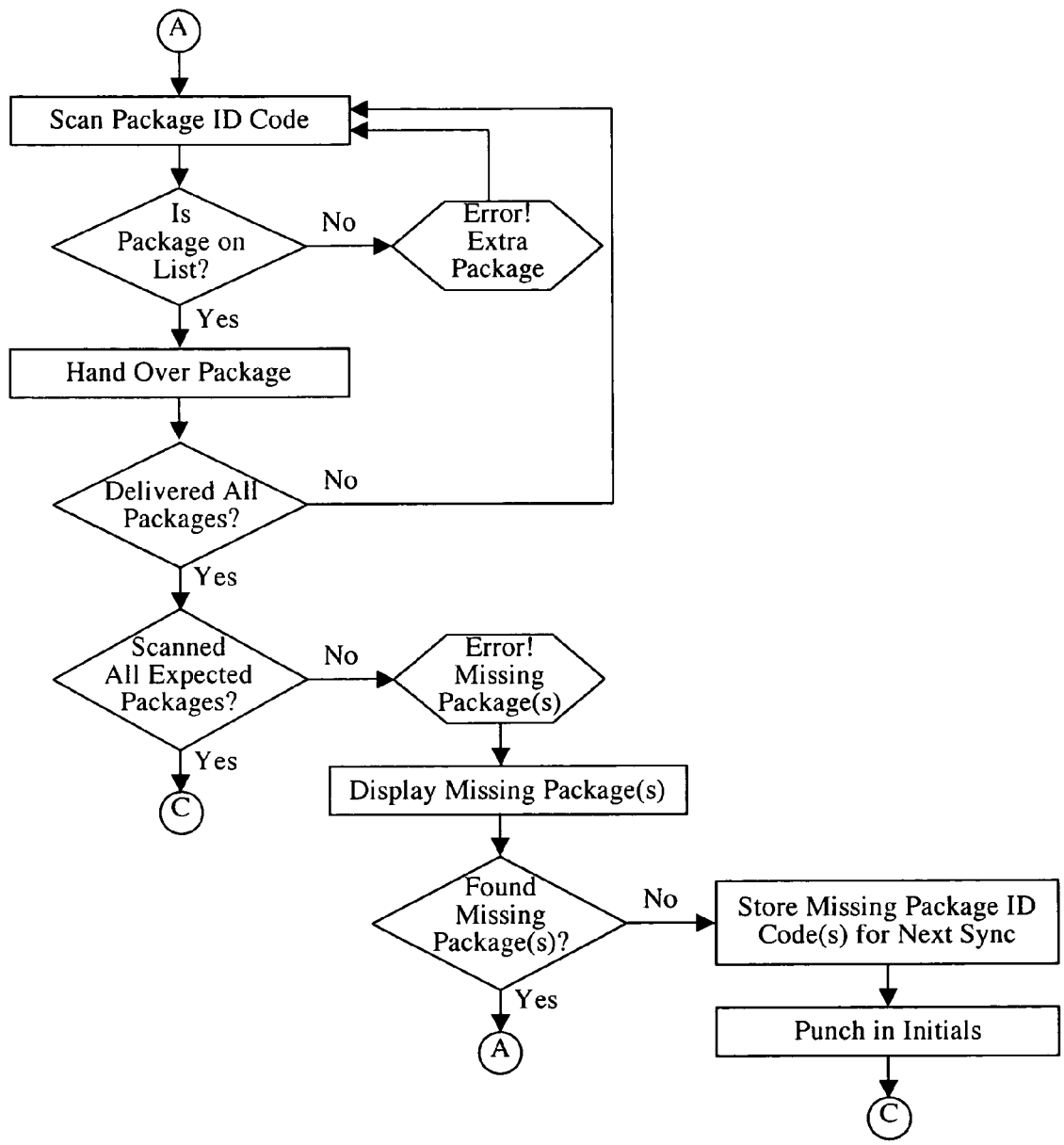

If the transaction is a delivery, after verifying that the location is correct, the driver "scans out" packages for the destination previously "scanned in" at one or more pickups that are linked to the current destination and scheduled time. As shown in FIG. 4, if he scans a package that is not expected at the current location, or if he fails to scan an expected package, the mobile unit is programmed to trigger an alarm and not to proceed with the transaction, unless the driver finds the right packages or manually overrides the verification in a way that is recorded to the server.

Figure 5:
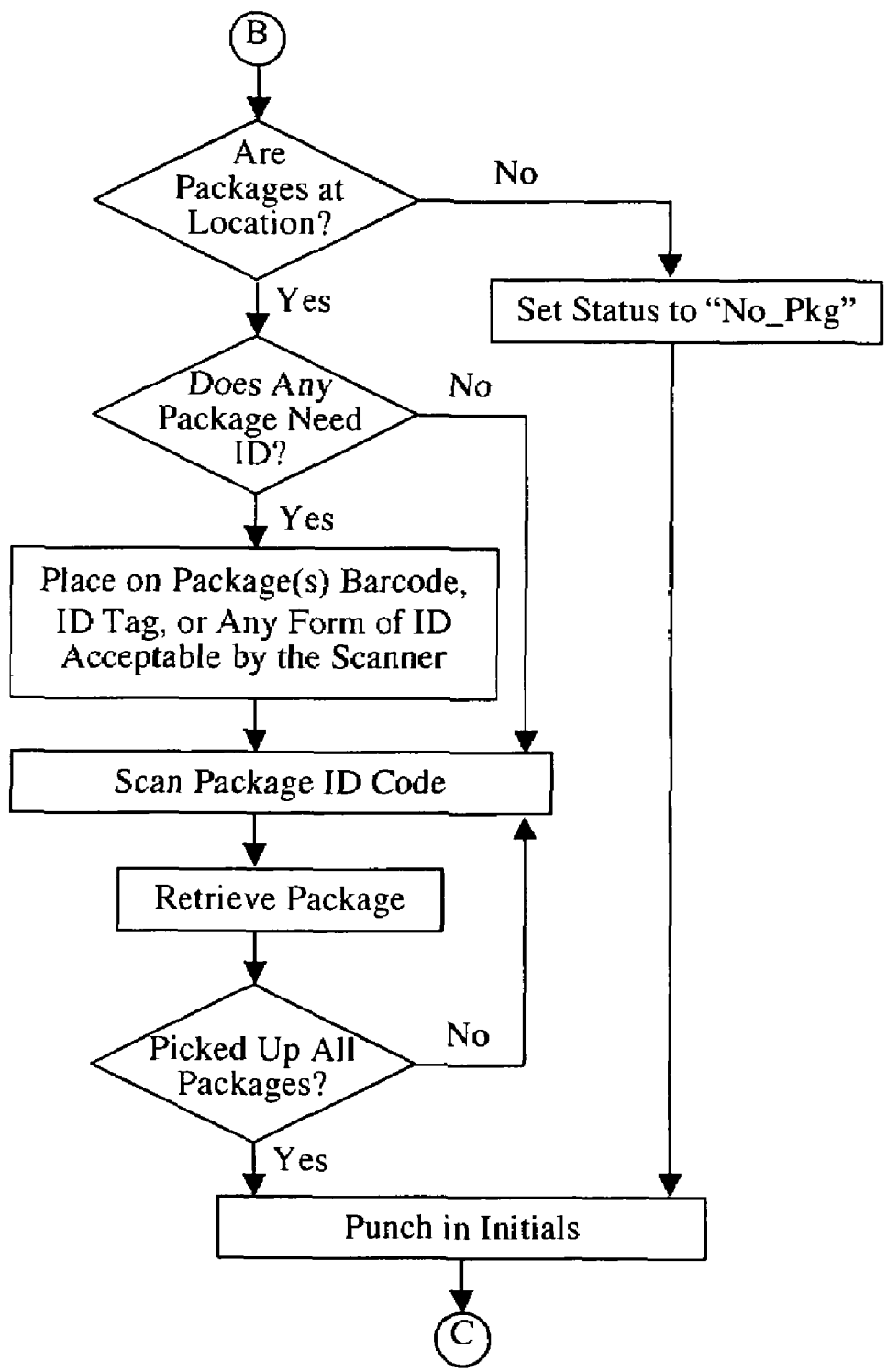
Figure 6:
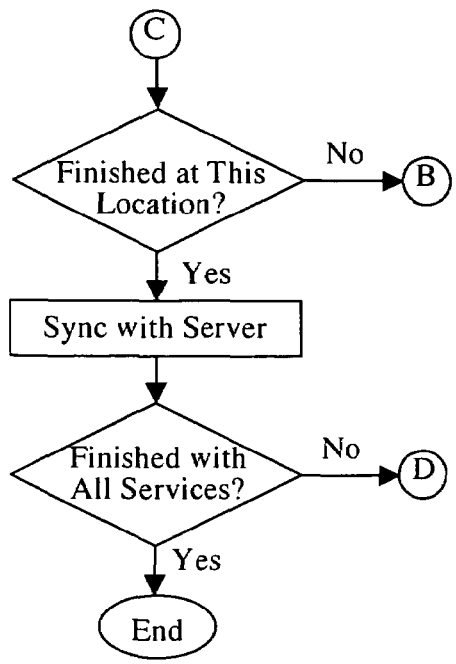

If the transaction is a pickup, package IDs are "scanned in" to the system, as shown in FIG. 5. If there is more than one delivery to be picked up at the stop, packages for each delivery are scanned in separate batches. Using the keypad of the mobile unit, the driver punches in initials of the receptionist or a brief note and then presses a button to sync with the server. After a few seconds, pickup time and package IDs are available to end-users having proper access to the server. If the mobile unit is momentarily out of the range of the cellular network or the Internet, package IDs are stored locally (at the client side) and automatically uploaded to the server upon re-establishing its wireless phone and/or Internet connectivity. Locally stored package IDs are also used in the next delivery.

Sometimes packages are brought to sort stations in a journey involving two or more routes before reaching destinations. IndeliTrak distinguishes between sort stations and endpoints so packages can be tracked end-to-end and customers need not be exposed to excessive detail. This is beneficial to those customers who track hundreds or thousands of deliveries a day. IndeliTrak tracks packages mainly by linking pickups and delivery stops which are provided to customers in real time. Therefore, unlike FedEx® or UPS®, an IndeliTrak customer does not need to enter package IDs to see the status of their packages. Customers simply log in to their Web-based IndeliTrak account and conveniently access all pickup/delivery records, both current and archived, that are associated with their account. Those customers without web accounts can receive reports by email, fax, or over the phone from courier personnel with access to the web reports.

Figure 7:
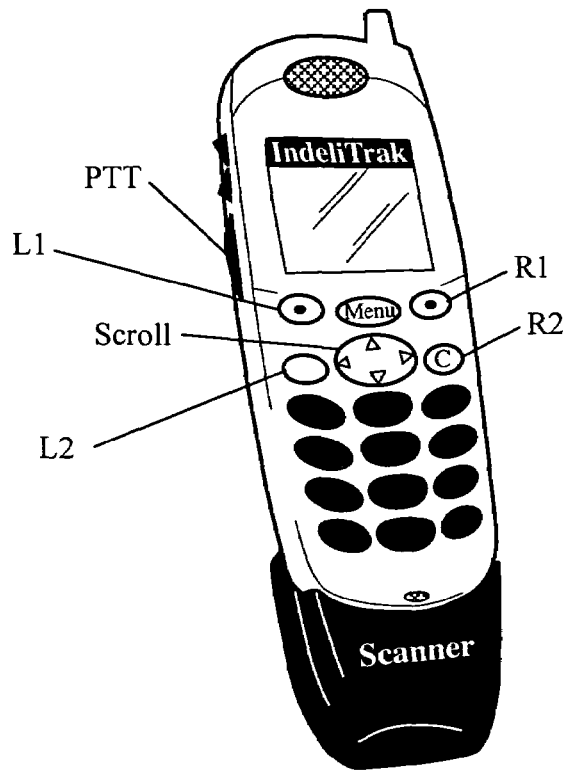
FIG. 7 illustrates an exemplary mobile unit implementing the present invention.

A specific working example of IndeliTrak will now be described with reference to FIGS. 7-8S. FIG. 7 illustrates an exemplary mobile unit 710 implementing the present invention. Similar to the mobile unit 110 discussed above, the mobile unit 710 comprises a cell phone and an attached IR barcode reader. In addition to standard functions and capabilities typical of today's cellular phones, e.g., text messaging, wireless Internet, etc., the mobile unit 710 is embedded with a GPS transceiver and may have other wireless capabilities such as Bluetooth®, Push-to-Talk (PTT) direct connect/2-way radio, and so on. Further, the mobile unit 710 is programmed with IndeliTrak object-oriented based software, which conforms to the established Internet Protocol (IP) and can connect to the World Wide Web (the Web) wirelessly.

As shown in FIG. 7, the mobile unit has functional buttons such as Menu and Scroll and a standard keypad. One skilled in the art will appreciate that other types and configurations of the mobile unit 710 are possible. The IndeliTrak software can be readily adapted to run on most any mobile phones available on the market today.

When a driver is ready to start his day, he turns on the phone (if necessary), browses the Menu, selects Java Applications, and runs IndeliTrak. These steps can be accomplished by pressing a combination of designated buttons, which could include the Menu, Scroll, R1, R2, L1, and L2. One skilled in the art will appreciate that other combinations and configurations of functional keys and buttons are possible. The examples shown in the drawings demonstrate how the present invention works and are not meant to be limiting.

Figure 8A:
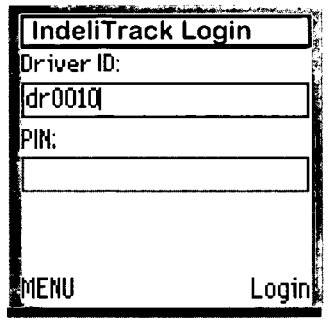
FIGS. 8A-8S are screenshots of a mobile phone programmed to implement an embodiment of the present invention.

After IndeliTrak is invoked, a login screen appears as shown in FIG. 8A. The driver enters his personnel number (e.g., driver ID) and personal identification number (PIN) and selects "Login" by, for example, pressing the R1 button.

Figure 8B:
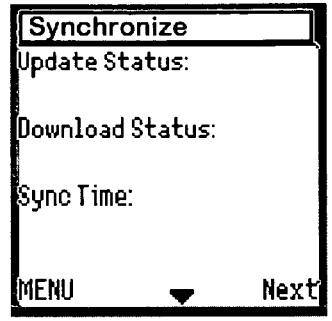
Figure 8C:
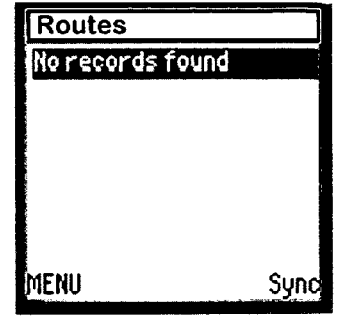
Figure 8D:

After logging in, a synchronize screen appears, as shown in FIG. 8B. The driver proceeds to retrieve his assigned route from the server by pressing R1 to go to the "Next" step. A "routes" screen next appears, as shown in FIG. 8C. "No records found" is shown before synchronization begins. Within a few seconds, the assigned route is downloaded from the server and the first service stop is shown on the screen, as shown in FIG. 8D.

Figure 8E:
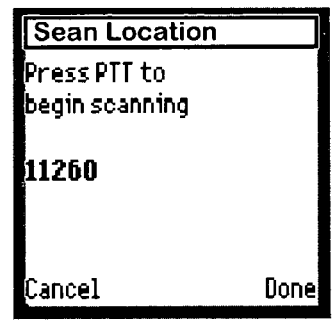

Upon arrival at the first location, the driver scans the location barcode placed at a designated space that is usually hidden from public sight, for example, on the doorjamb. It should be placed before the first service is taken place there. After selecting "ScLoc", a scan location screen appears, as shown in FIG. 8E. The driver points the barcode reader (scanner) at the center over the location barcode and presses the PTT button. The mobile unit makes a sound to indicate that the location barcode has been obtained. The driver then selects "Done".

Figure 8F:
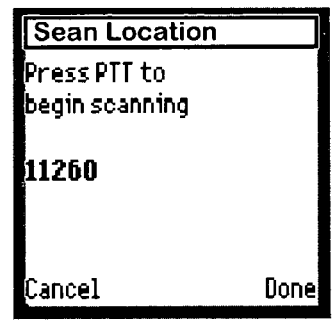
Figure 8G:
Figure 8H:

FIG. 8F shows that the first scheduled service at that location is a pickup service. The driver selects "ScPkg" and presses the PTT button to scan a package ID code or barcode label placed on the package, which may be an envelope, a box, a tube, a basket, a tire, etc. If there is no ID label on the package, the driver puts one on or asks the customer to provide one. Again, the mobile unit makes a sound when the scan is completed. This process is repeated until all packages at the location are scanned in, after which the driver enters the initials of the customer's representative or a designated number (e.g., "1" indicates "receptionist") into the mobile unit and selects "SavNxt", as shown in FIG. 8G, to complete the pickup service. If the driver has another pickup service at the same location, as shown in FIG. 8H, the driver selects "ScPkg" and follows the same steps described above.

Figure 8I:
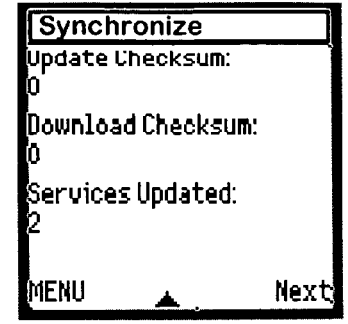
Figure 8J:

When the driver completes his service at the location, he proceeds to the next service location by selecting "Next", as shown in FIG. 8I. The screen, as shown in FIG. 8J, returns to the initial display (see FIG. 8D) and is ready for the next location scan.

Figure 8K:
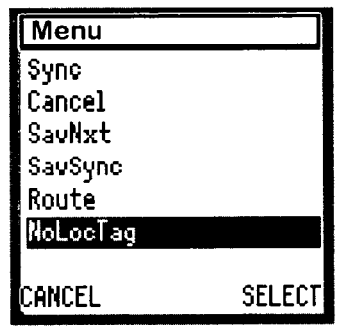
Figure 8L:
Figure 8M:
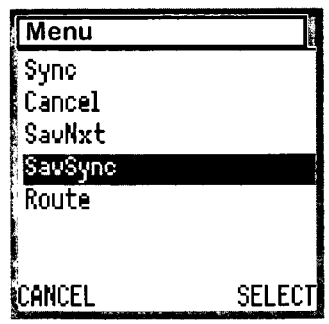
Figure 8N:
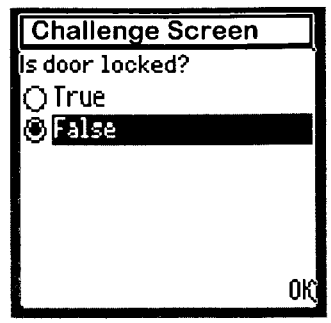
Figure 8O:
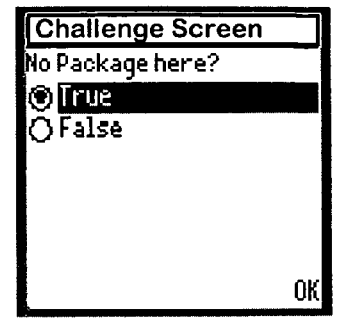

If no location label is found at a service location, the driver presses the Menu button and scrolls to "NoLocTag", as shown in FIG. 8K. A "ScPkg" screen appears, as shown in FIG. 8L, and the driver may proceed to conduct his services (pickup and/or delivery). This allows the driver to bypass the location scan step, but the driver must inform an IndeliTrak administrator or dispatcher of the missing location label. If the location barcode tag is missing or damaged, the driver may press the menu button and select "NoLocTag". This will record arrival time and allow the transaction but will indicate to the server that no location tag was scanned. A replacement tag is then printed for the driver to affix at that address on the next day he returns.

If the driver arrives at a location, but is not able to get in or access the location label, he enters "NoLocTag" as described above and scrolls to "SavSync", as shown in FIG. 8M. After selecting "SavSync", the driver must answer several appropriate questions, such as those shown in FIGS. 8N and 8O. One of the buttons, such as R2, may be programmed as a secondary select button to facilitate the driver to select/unselect his answers.

Figure 8P:
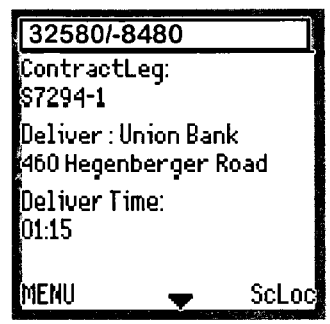

The delivery process is similar to the pickup process descried above. The driver first scans in the location code, as shown in FIG. 8P, and then scans all package ID labels for that location. Next, he enters the initials of the receiving person at the location and selects "SavSync" to upload the information gathered.

Figure 8Q:

After the driver has scanned out all packages at the location and there is one or more package missing from the delivery batch, a message screen appears with the missing package number(s), as shown in FIG. 8Q. It is possible that the driver simply missed scanning the listed package. If the driver is not able to locate the missing package, the driver must inform an IndeliTrak administrator or dispatcher.

Figure 8R:
Figure 8S:

If "Unexpected Pkgs" appears on the screen, as shown in FIGS. 8R and 8S, it could mean that a listed package does not belong in that particular batch of delivery. The message goes away after removing the listed package or item from the batch. The IndeliTrak mobile unit is programmed to handle various scenarios typical of routine delivery and pickup services. For out of ordinary situations, the driver is instructed to inform an IndeliTrak administrator or dispatcher who will then assist the driver to complete the service.

According to an aspect of the invention, IndeliTrak is optimized for the route-based segment of the courier industry where customer pickups for one courier company (contractee) are often contracted out to another courier company (contractor) with established routes in the target location. IndeliTrak is particularly advantageous when both contractee and contractor utilize the system. As an example, the contractee proposes an assignment to a contractor within IndeliTrak. The contractor immediately sees new proposed assignment and, if he accepts, can promptly place the customer on one of his routes. Pickup and delivery data for the contracted customer is communicated back to the contractee (an IndeliTrak request) for tracking by appropriate personnel (e.g., managers) and the customer.

As one skilled in the art will appreciate, most digital computer systems can be installed with the present invention. To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the invention described heretofore, it in effect becomes a special purpose computer particular to the present invention. The necessary programming-related techniques are well known to those skilled in the art and thus are not further described herein for the sake of brevity.

Computer programs implementing the invention described herein can be distributed to users via the Internet or on a computer-readable medium such as floppy disk, memory module, or CD-ROM and are often downloaded or copied onto a hard disk or other storage medium. When such a program of instructions is to be executed, it is usually loaded from the remote server, the distribution medium, the hard disk, or other storage medium into the random access memory of the computer, thereby configuring the computer to act in accordance with the invention disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the invention disclosed herein. The IndeliTrak server, accessed by courier drivers, management, partners, and customers can be managed by the courier company being used or by a third-party Application Server Provider (ASP). The software for the remote clients is downloaded over the wireless phone network.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. For example, barcode/RFID combo tags can be applied to packages destined for high-volume delivery destinations. In this case, the driver scans these packages into the system using the mobile unit's barcode reader or scanner. At time of delivery, he carries the packages past RFID antennas connected to the Internet to record package IDs onto the IndeliTrak database in real time, instead of scanning them out using the barcode reader.

In some embodiments, IndeliTrak is implemented to gather information needed for billing customers and paying drivers as well as contractors. In some embodiments, IndeliTrak is implemented to apply Service Level Agreement discounts for late pickups or deliveries. In some embodiments, IndeliTrak is implemented to enable a user to generate, print, email bills, and/or create reports of data for export to check-printing systems. Alternatively, IndeliTrak is implemented to perform these tasks automatically.

Although the exemplary embodiment of IndeliTrak disclosed herein is designed for the package delivery courier industry, one skilled in the art will readily recognize that IndeliTrak can be implemented for various industries, for instance, medical examination, livestock, security guard, airline baggage, and so on. Accordingly, the scope of the present invention should be determined by the following claims and their legal equivalents.

We claim:

1. A computerized tracking system, comprising:
a server connected to a distributed computer network;
a storage means implementing a database connected to said server;
at least one client capable of communicating with said server and said database in real time either wirelessly through a cellular network or directly through said distributed computer network; wherein
said client is characterized as a mobile unit configured with computer executable program instructions; wherein
a first portion of said instructions when executed enables a courier to log in, retrieve information about his daily service route stops, scan service locations and packages, and log off; wherein
a second portion of said instructions when executed automatically records arrival and completion times, verifies service locations, transmits tracking data gathered at said stops, and monitors and reports events and errors associated therewith; wherein
a third portion of said instructions when executed provides an intelligent linkage that links each individual package to its pickup stop, each pickup stop to one or more delivery stops, and each delivery stop to one or more pickup stops; and wherein
said linkage allows a customer to generate, obtain, or reuse arbitrary identification codes for individual packages which remain unknown to said courier until said individual packages are scanned for pickup.

2. The computerized tracking system of claim 1, wherein said server comprises a browser-based user interface that enables a remote user to find and track individual packages without having to know individual identification codes associated therewith.

3. The computerized tracking system of claim 1, wherein said mobile unit consisting essentially of a cellular phone and a code scanner attached to said phone.

4. The computerized tracking system of claim 1, wherein said tracking data include user login identification number, user password or personal identification number, location codes, arrival times, package identification codes, recipient initials, completion times, and error messages.

5. The computerized tracking system of claim 1, wherein said database receives, stores, and provides scheduled pickup and delivery times, designated pickup and delivery locations, and package identification codes scanned by said courier during said daily service route stops.

6. The computerized tracking system of claim 1, wherein said information includes scheduled pickup and delivery times, designated pickup and delivery locations, phone numbers, names, directions, and special handling instructions.

7. The computerized tracking system of claim 1, wherein said arbitrary identification codes are non-serialized barcodes, radio frequency identification tags, or electronic product codes.

8. The computerized tracking system of claim 1, further comprises a plurality of location code labels or stickers, each of which is affixed at one of said service route stops.

9. The computerized tracking system of claim 8, wherein said mobile unit has a Global Positioning System (GPS) transceiver that enables said courier to verify location without using said location code labels or stickers.

10. The computerized tracking system of claim 1, wherein an incorrect location code or an unexpected package is scanned; and wherein said mobile unit is programmed to trigger an alarm and not to proceed.

11. The computerized tracking system of claim 10, wherein said mobile unit is programmed to allow said courier to manually override a previously sorted list of stops and to select a stop that corresponds to said scanned location code.

12. The computerized tracking system of claim 1, wherein an expected package is not scanned; and wherein said mobile unit is programmed to trigger an alarm and not to proceed.

13. The computerized tracking system of claim 1, wherein said distributed computer network is the Internet; wherein said database is a relational database; and wherein said server is built with a Web-based application server and a relational database server.

14. A computer-readable medium storing a computer program implementing the computerized tracking system of claim 1.

15. The computerized tracking system of claim 1, wherein said mobile unit has a Global Positioning System (GPS) transceiver.

* * * * *